(12) United States Patent
Östling et al.

(10) Patent No.: US 10,174,565 B2
(45) Date of Patent: Jan. 8, 2019

(54) DRIVER FOR TORQUE AND ROTATION TRANSFER FROM A ROTATIONAL CHUCK TO A DRILL STEEL

(75) Inventors: Thomas Östling, Eskilstuna (SE); Linda Göthlin, Stora Mellösa (SE)

(73) Assignee: Epiroc Rock Drills Aktiebolag, Orebro (SE)

( * ) Notice: Subject to any disclaimer, the term of this patent is extended or adjusted under 35 U.S.C. 154(b) by 345 days.

(21) Appl. No.: 13/261,539

(22) PCT Filed: Jun. 1, 2011

(86) PCT No.: PCT/SE2011/050690
§ 371 (c)(1),
(2), (4) Date: Dec. 10, 2012

(87) PCT Pub. No.: WO2012/002876
PCT Pub. Date: Jan. 5, 2012

(65) Prior Publication Data
US 2013/0114999 A1 May 9, 2013

(30) Foreign Application Priority Data
Jun. 30, 2010 (SE) ...................................... 1000703

(51) Int. Cl.
*F16D 1/00* (2006.01)
*E21B 17/03* (2006.01)
*F16D 1/10* (2006.01)

(52) U.S. Cl.
CPC ........ *E21B 17/03* (2013.01); *F16D 2001/103* (2013.01); *Y10T 403/7026* (2015.01); *Y10T 403/7035* (2015.01)

(58) Field of Classification Search
CPC ......... F16D 2001/102; F16D 2001/103; F16D 1/00; F16D 1/101; E21B 17/03
USPC .................. 403/298, 359.1, 359.6; 464/182; 81/124.3; 173/104
See application file for complete search history.

(56) References Cited

U.S. PATENT DOCUMENTS

| | | | | |
|---|---|---|---|---|
| 3,111,261 A | * | 11/1963 | Bentele et al. | ................ 418/179 |
| 3,396,554 A | * | 8/1968 | Westercamp | ................ 464/143 |
| 3,593,933 A | * | 7/1971 | Grashorn | ............. B65H 75/245 |
| | | | | 242/571.6 |
| 3,892,107 A | | 7/1975 | Handen et al. | |
| 4,068,727 A | | 1/1978 | Andersson et al. | |
| 4,134,460 A | * | 1/1979 | Klemm | ........................ 173/218 |
| 4,153,260 A | | 5/1979 | Joyner | |

(Continued)

FOREIGN PATENT DOCUMENTS

| | | |
|---|---|---|
| JP | 8193625 | 7/1996 |
| JP | 10331861 | 12/1998 |

(Continued)

*Primary Examiner* — Josh Skroupa
*Assistant Examiner* — Matthew R McMahon
(74) *Attorney, Agent, or Firm* — Mark P. Stone (57) ABSTRACT

A driver (3) for the transfer of torque and rotation from a rotation chuck (5) to a drill steel (2), whereby the cross-section of the driver (3) is limited outwards by curves, in particular by arcs, united to form a closed FIG. 6 that can be approximately described as a polygon, and limited inwards by splines (4). The FIG. 6 comprises four sides (7) and four corners (8). The splines (4) comprise a number of spline teeth (10), the number of which is divisible by four.

7 Claims, 5 Drawing Sheets

(56) References Cited

U.S. PATENT DOCUMENTS

| | | | |
|---|---|---|---|
| 4,161,990 A | | 7/1979 | Ekwall et al. |
| 4,194,581 A | * | 3/1980 | Walter ............................ 175/92 |
| 4,827,800 A | * | 5/1989 | Pedersen et al. ............. 475/162 |
| 4,934,883 A | | 6/1990 | Andersson et al. |
| 5,632,301 A | * | 5/1997 | Julicher ........................ 137/296 |
| 5,848,334 A | * | 12/1998 | Kamola .................. F16D 1/101 |
| | | | 399/167 |
| 7,445,558 B2 | * | 11/2008 | Gerding et al. .............. 464/182 |
| 7,867,099 B2 | * | 1/2011 | Szentmihalyi et al. ...... 464/182 |
| 7,891,902 B2 | * | 2/2011 | Pettey .......................... 403/313 |
| 8,506,202 B2 | * | 8/2013 | Nakagawa et al. ......... 403/359.6 |
| 8,662,043 B2 | * | 3/2014 | Dollinger ............. B21D 53/845 |
| | | | 123/90.16 |
| 2002/0168222 A1 | * | 11/2002 | Simons et al. ............. 403/359.1 |

FOREIGN PATENT DOCUMENTS

| | | |
|---|---|---|
| WO | WO 86/02694 | 5/1986 |
| WO | WO 2006/043878 | 4/2006 |
| WO | WO 2010139441 A1 * 12/2010 ............... F16D 1/10 |

\* cited by examiner

DRIVER FOR TORQUE AND ROTATION TRANSFER FROM A ROTATIONAL CHUCK TO A DRILL STEEL

BACKGROUND OF THE INVENTION

The invention concerns a driver for the transfer of torque and rotation to the drill steel in a rock drilling machine. The driver is an exchangeable part subject to wear, and has been designed for mounting in the gear housing of the rock drilling machine, where its task is to transfer torque and rotation from a rotation chuck to the drill steel. The drill steel can be displaced axially in the driver during the transfer. The driver is for this purpose externally provided with a polygonal profile and internally provided with splines. The polygonal profile and the splines are in the present invention arranged in an innovative manner that increases the lifetime of the driver and reduces the risk of fatigue failure. The invention concerns also a rock drilling machine that comprises at least one such driver.

Figure 1:
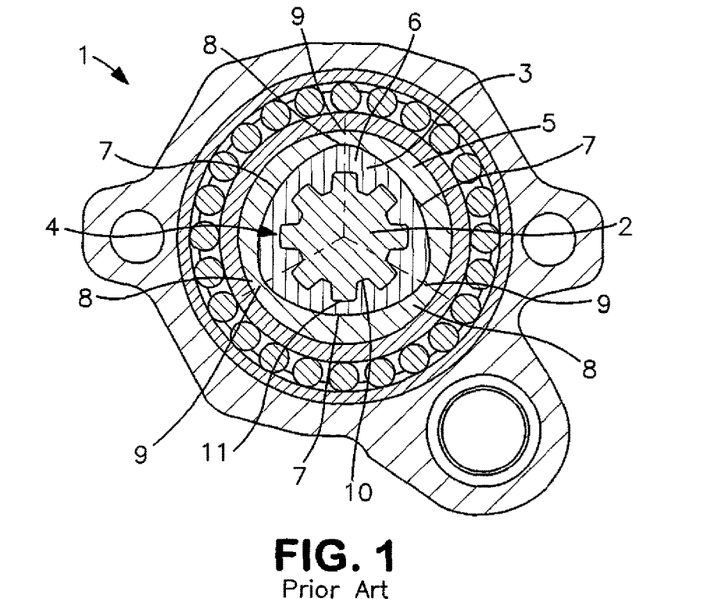

FIG. 1 shows a reduced section of a prior art gear housing 1 of a rock drilling machine. The upper part, known as the shank adapter, of a drill steel 2 can be seen in the centre of the gear housing 1. The shank adapter is externally provided with splines. The shank adapter is inserted into a known driver 3 that is provided with internal splines 4 that correspond to the splines of the shank adapter. The driver 3 is provided with an external polygonal profile and is mounted into a rotation chuck 5 that has an internal polygonal profile that corresponds to the polygonal profile of the driver 3. The rotation chuck 5 is arranged on bearings in the gear housing 1 and is rotated by the rotational motor of the rock drilling machine through a gear (not shown in the drawing). The torque that is transferred may amount to 1000 Nm or more.

The cross-section of the driver 3 is limited outwards by curves, united to form a closed FIG. 6 that is approximately described by a polygon with three sides 7 and three corners 8. This type of united figure is normally known as a "polygon profile". The FIG. 6 is transversed by three imaginary lines 9 of symmetry, drawn from the centre of the driver 3 and passing through the corners 8 of the FIG. 6 such that these are symmetrically distributed around the lines 9 of symmetry.

The cross-section of the driver 3 is limited inwards by the splines 4 with eight spline teeth 10 and eight spline spaces 11. The drawing makes it clear that it is possible to arrange only one of the eight spline spaces 11 symmetrically around any one of the three lines 9 of symmetry. When one of the spline spaces 11 is arranged symmetrically around the uppermost of the lines 9 of symmetry, two of the spline teeth 10 acquire an asymmetric distribution around the two lower lines 9 of symmetry. Similar results would have been obtained if one of the spline teeth 10 had been initially taken. The asymmetry leads to certain parts being subject to considerably higher load than other parts of the driver 3.

Figure 2:
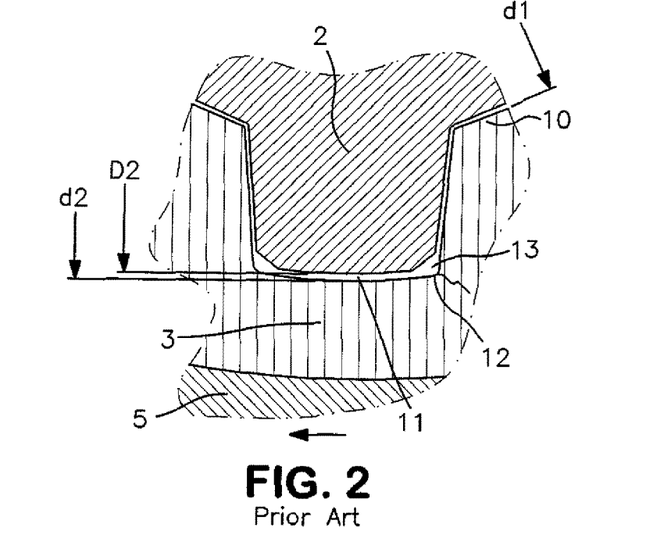

FIG. 2 shows an enlarged cross-section of one of the spline spaces 11 of the prior art driver 3, the shank adapter of the drill steel 2 and the rotation chuck 5 from FIG. 1. The direction of rotation of the rotation chuck 5 is shown by an arrow at the bottom. The driver 3 is arranged such that the ratio between the diameter d2 of the bottom circle of the spline 4 and the diameter d1 of the top circle is 1.38. The diameter D2 of the top circle of the spline teeth of the shank adapter is adapted such that it constitutes approximately 98% of the diameter d2 of the bottom circle of the splines 4 of the driver 3. The arrangement and the contact pressure between the spline teeth 10 of the shank adapter and the driver 3 lead to small amounts of the material of the driver 3 being pressed down to the root radii 12 of the spline spaces 11 during the transfer of torque. The material that is pressed down constitutes fracture notches or burrs 13 along the radii 12 and impairs in this way its function of protecting from fatigue failure. The drawing shows how these burrs 13 initiate the formation of cracks in the root radii 12.

SUMMARY OF THE INVENTION

The aim of the present invention is to obtain, according to the claims, a driver and a rock drilling machine in which the previously described disadvantages are overcome. The polygonal profile and the splines are arranged in the present invention in an innovative manner that reduces the loads and distributes them symmetrically in the driver. The splines of the driver are so designed that a burr that arises as a consequence of wear is separated from the bottom of the radius. An additional advantage of the invention is that it can be introduced without significant increase in the outer dimensions of the gear housing.

BRIEF DESCRIPTION OF THE DRAWINGS

The invention will be described in more detail with the aid of the attached drawings, FIGS. 1-2 showing a reduced section of a prior art gear housing and FIG. 2 showing an enlarged cross-section of a spline of a prior art driver.

DETAILED DESCRIPTION OF THE INVENTION

Figure 3:
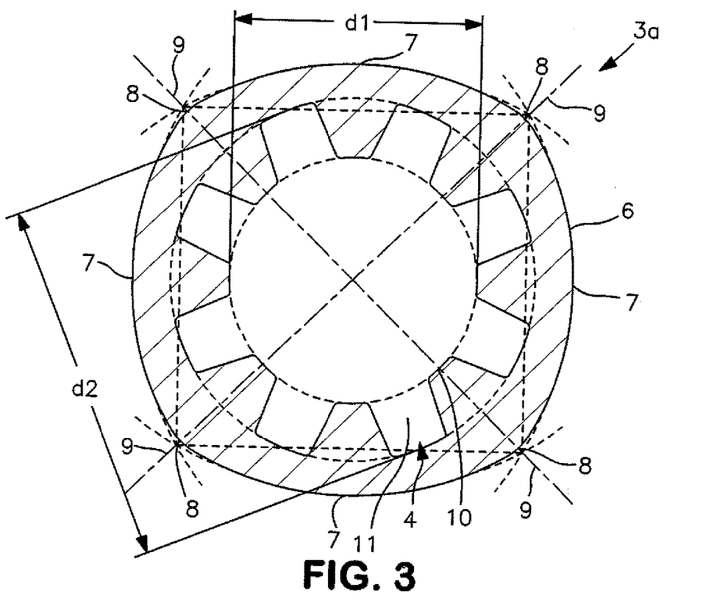
FIG. 3 shows a reduced cross-section of a driver according to the present invention.

FIG. 3 shows a cross-section of a driver 3a. The driver has essentially the same cross-section along its complete length. The length of the driver 3a is adapted such that an acceptable contact pressure is obtained during the transfer of torque. The driver 3a is made from bronze, but may be made from cast iron or other material with similar frictional properties.

The cross-section of the driver 3a is limited outwards by curves, or to be more precise arcs, united to form a closed FIG. 6. The closed FIG. 6 in the present invention comprises four sides 7 and four corners 8 and can be approximately described by a convex polygon. A polygon is defined as a plane figure that is limited by straight lines, i.e. by straight curves. If straight lines are drawn between the intersection points of the imaginary extensions of the sides 7 of the closed FIG. 6, a polygon is formed. (The extensions and the polygon are shown in the drawing by dashed lines.) This fact defines the significance of the concept of "approximately" in this context.

Each side 7 comprises an arc of a circle and all of the arcs of the circles for all sides 7 have the same radius and length. The corners 8 are arranged in a similar manner. Each corner 8 comprises an arc of a circle and all of the arcs of the circles for all corners 8 have the same radius and length. It is also possible to allow the sides 7 or the corners 8 to comprise other types of arcs and/or curves, than arcs of a circle. The connections between the arcs are arranged at points at which the tangents to the connected arcs coincide. The result of this is that high concentrations of tension do not arise in the driver 3a.

The cross-section of the driver 3a is limited inwards by splines 4 that comprise a number of spline teeth, the number of which is divisible by 4, for example, one spline set 4 with eight spline teeth 10 and eight spline spaces 11. It is also possible to arrange the splines 4 to have twelve or sixteen spline teeth 10. The splines 4 are arranged such that four of the spline teeth 10 acquire a symmetrical distribution around imaginary lines 9 of symmetry that extend from the centre of the driver 3a through the closed FIG. 6. The lines 9 of symmetry have been drawn such that the FIG. 6 is symmetrically distributed around the lines 9 of symmetry. It is optimal if the splines 4 are arranged with eight or twelve spline teeth 10 and such that four of the spline teeth 10 acquire a symmetrical distribution around imaginary lines 9 of symmetry that extend from the centre of the driver 3a through the corners 8 of the closed FIG. 6. The arrangement ensures that loads are minimal and symmetrically distributed within the driver 3a. These positive properties are independent of the direction of rotation of the driver 3a, and thus the risk of erroneous assembly is small. It is possible also to distribute four of the spline spaces 11 of the splines 4 symmetrically around the lines 9 of symmetry through the corners 8. The loads in the driver 3a will in this case be somewhat greater, but they will still be lower than in the previously described prior art driver 3.

Figure 8:
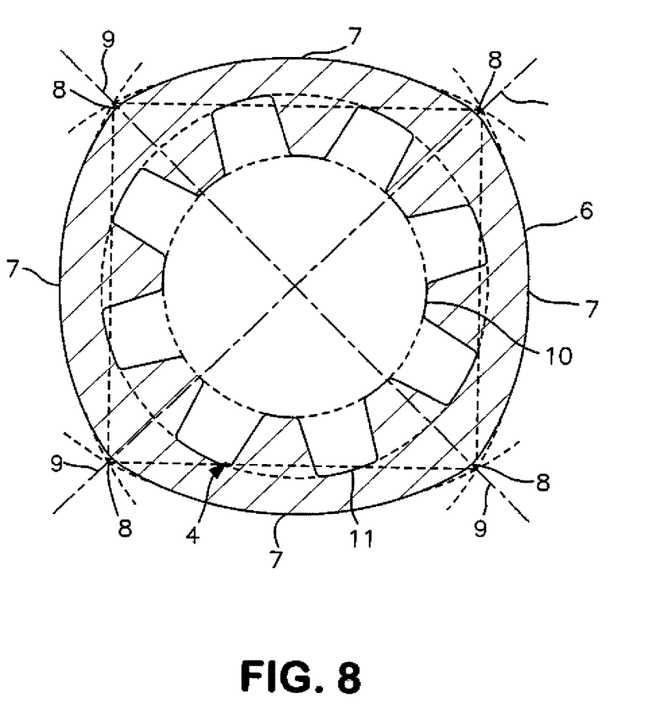
FIG. 8 is similar to FIG. 3 and shows splines arranged asymmetrically around lines of symmetry through the corners of the driver.

The spline teeth 10 and spline spaces 11 of the splines 4 can be arranged also asymmetrically around the lines 9 of symmetry through the corners 8, as illustrated by FIG. 8. While it is true that the loads will acquire a displaced symmetrical distribution in the driver 3a during the transfer of torque, this distribution may even so be advantageous for the transfer in a specified direction of rotation. The driver 3a according to the latter design must be assembled such that it acquires the specified direction of rotation.

The relationship between the diameter d2 of the bottom circle of the splines 4 and the diameter d1 of the top circle is arranged to be greater than in the prior art driver. (Both d1 and d2 are shown with dashed circles in the figure.) This brings advantages that will be described in more detail in association with FIG. 4. Good results can be achieved at a ratio of 1.39 or higher, for example a ratio of 1.48±0.02. It is, however, best to arrange the splines 4 such that the ratio d2/d1 is 1.48. Greater ratios that 1.48 can require significant increases in the outer dimensions of the gear housing.

Figure 4:
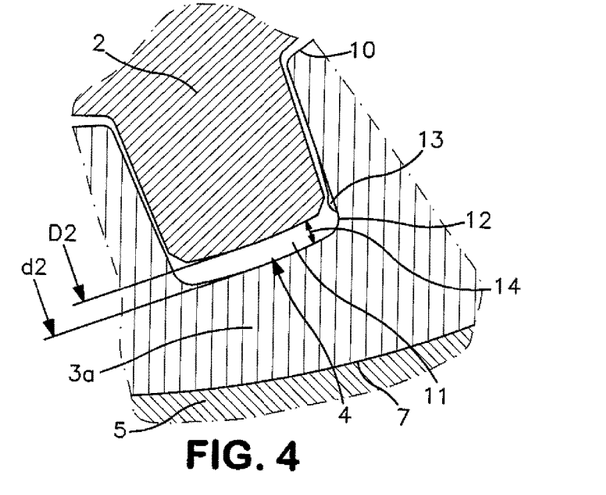
FIG. 4 shows an enlarged cross-section in detail of the driver in FIG. 3, mounted the gear housing of a rock drilling machine.

FIG. 4 shows how the new ratio d2/d1 =1.48 (as shown in FIG. 3) contributes to creating chambers 14 between the top of the spline teeth of the shank adapter (the drill steel 2) and the bottom of the spline spaces 11 of the driver 3a. The shank adapter of the drill steel 2 will therefore be controlled radially by the tops and the flanks of the spline teeth 10 of the splines 4. The drawing shows also how the diameter D2 of the top circle of the spline teeth of the shank adapter constitutes approximately 95% of the diameter d2 of the bottom circle of the splines 4 of the driver 3a. A burr 13 forms as a consequence of wear, in accordance with the same process as has been previously described in association with FIG. 2. However, due to the chambers 14, these burrs 13 are never pressed so deeply down into the bottoms of the spline spaces 11 such that they reach the root radii 12 at the transition to the spline teeth 10. The burrs 13 can therefore be said to be separated from the root radii 12, and the new driver 3a is in this respect better protected against fatigue failure than the prior art drivers 3 shown in FIGS. 1-2.

Figure 7:
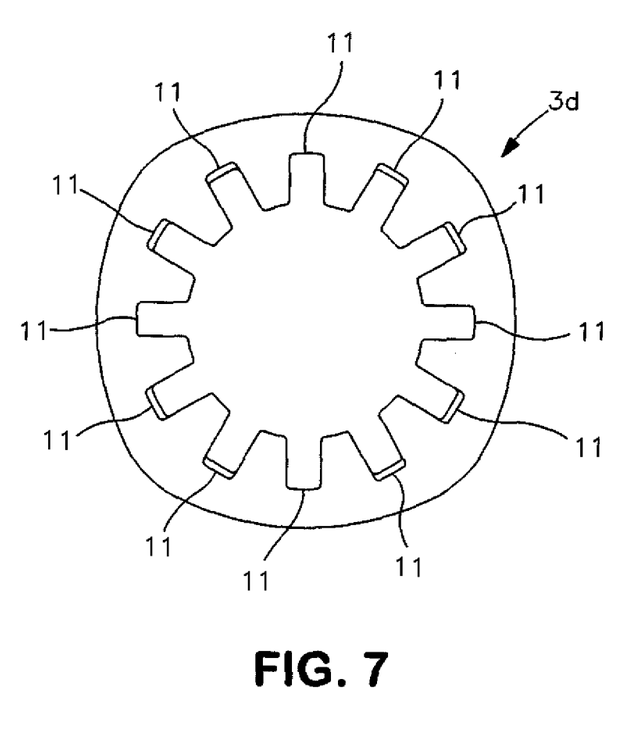

It is preferable that the driver 3a be arranged such that the chambers 14 are created between the top of all of the spline teeth of the shank adapter (the drill steel 2) and the bottom of all spline spaces 11 of the driver 3a in order to eliminate fracture notches or burrs 13 also in the radii that experience the least load. It should, however, be noted that the driver 3a can be arranged such that only one or a few of the spline teeth of the shank adapter (the drill steel 2) make contact with the bottom in only one or a few of the spline spaces 11 of the driver 3a, as is shown in FIG. 7. It is namely the case in FIG. 7 that the ratio between the diameter d2 (not shown in the drawing) of the bottom circle of the splines 4 and the diameter d1 (not shown in the drawing) of the top circle is not the same for all spline spaces 11 of the driver 3d.

Figure 5:
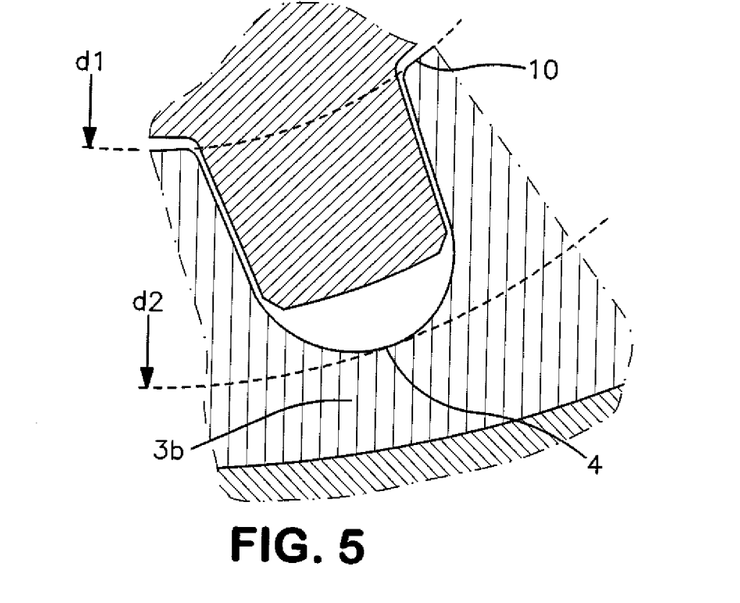
FIGS. 5-7 show alternative designs of the splines of the driver.
Figure 6:
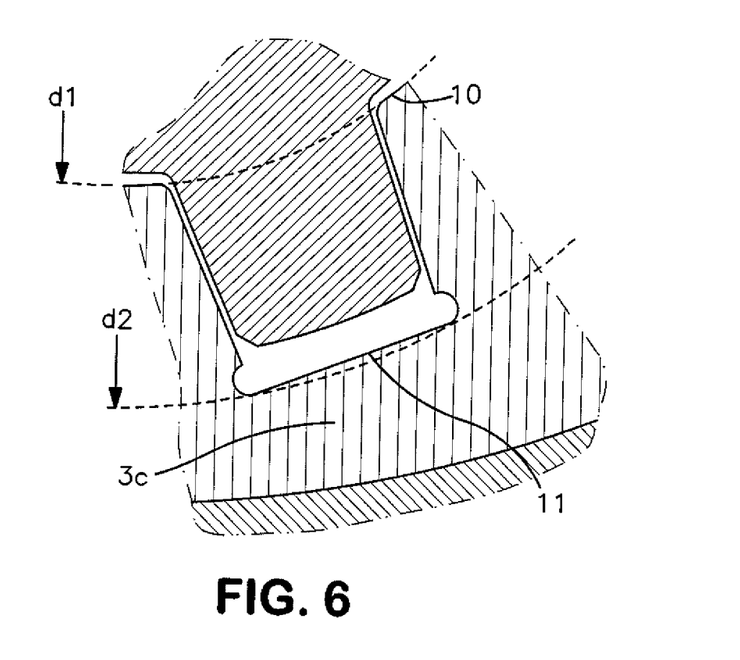

The bottoms of the spline spaces 11 in the splines 4 are arranged in FIGS. 3-4 as arcs of a circle with a diameter of the bottom circle equal to d2. FIG. 5 and FIG. 6 show alternative arrangements of the spline spaces 11 of the splines 4 of drivers 3b and 3c, respectively. The bottoms in FIG. 5 comprise an arc of a circle with a diameter that is considerably smaller than the diameter d2 of the bottom circle. The bottoms in FIG. 6 comprise a straight line and semicircular arcs at the transition to the spline teeth 10. The tops of the spline teeth 10 of the splines 4 are arranged as arcs of a circle with a diameter of the top circle equal to d1 It is, however, possible to arrange the tops with other diameters or other curves, or other diameters and other curves, than arcs of a circle. The diameter d2 of the bottom circle and the diameter d1 of the top circle are defined in the arrangements described above, and in similar designs, as the diameters of the imaginary circles (shown with dashed lines in the drawings) that can be narrowly placed with their curves in the region between the circles.

The new arrangement of the splines 4 of the drivers 3a, 3b, 3c, and 3d have been introduced in the description above such that it includes all spline teeth 10 and spline spaces 11 of the splines 4. It is, however, possible under certain circumstances to arrange some of the spline teeth 10 and spline spaces 11 of the splines 4 according to the design of the present invention and the remainder of the spline teeth and spline spaces according to the design of the splines in prior art drivers. Such a "combined" driver is to be considered to lie within the scope of the claims of the present application.

The invention claimed is:

1. A driver in combination with a drill steel for the transfer of torque and rotation from a rotation chuck to the drill steel, whereby the cross-section of the driver is the same along its length and limited outwards by convex curved sides, joined to form a dosed figure, and limited inwards by splines wherein the figure consists of four sides and four corners, and wherein the splines consist of a number of spline teeth and spline spaces defined therebetween, the number of spline teeth being divisible by four,
wherein four of the spline teeth or spline spaces of the splines are symmetrically distributed around lines of symmetry through the figure, and
wherein said lines of symmetry extend through the corners,
the drill steel comprising a plurality of corresponding spline teeth configured to be received in the spline spaces of the driver,
wherein the spline spaces have bottom surfaces defined between adjacent spline teeth, and wherein the bottom surfaces of the spline spaces and the adjacent spline teeth are arranged such that a chamber of predetermined volume is defined between the bottom surface of the spline space and the top of a corresponding spline tooth of said drill steel when said corresponding spline tooth is received in the spline space to prevent burrs from being pressed against root radii of the spline teeth, wherein a ratio between an outer diameter of the driver defined by inner bottom surfaces of said spline spaces and an inner diameter of the driver defined by the top surfaces of the spline teeth is at least 1.39, said predetermined volume of said chamber being defined between an outer diameter of the drill steel defined by the top of the corresponding spline teeth and the outer diameter of the driver defined by the bottom surfaces of the spline spaces, such that the outer diameter of the drill steel is approximately 95% of the outer diameter of the driver.

2. The driver and drill steel combination according to claim 1, wherein the splines comprise eight, twelve or sixteen spline teeth.

3. The driver and drill steel combination according to claim 1, wherein each side comprises an arc and wherein the arcs of all sides have the same radius and length, wherein each corner comprises an arc and wherein the arcs of all corners have the same radius and length.

4. The driver and drill steel combination according to claim 3, wherein the connections between the arcs are arranged at points at which the tangents to the connected arcs coincide.

5. A rock drilling machine comprising a driver and drill steel combination according to claim 1, wherein the driver is mounted into a rotation chuck for the transfer of torque and rotation from the rotation chuck to the drill steel.

6. The combination as claimed in claim 1, wherein said ratio is 1.48.

7. The combination as claimed in claim 1, wherein said ratio is 1.48 ±0.02.

* * * * *

UNITED STATES PATENT AND TRADEMARK OFFICE
CERTIFICATE OF CORRECTION

PATENT NO. : 10,174,565 B2
APPLICATION NO. : 13/261539
DATED : January 8, 2019
INVENTOR(S) : Thomas Ostling and Linda Gothlin Page 1 of 1

It is certified that error appears in the above-identified patent and that said Letters Patent is hereby corrected as shown below:

In the Claims

Claim 1, Line 5 (Column 4, Line 52): Delete "dosed" and substitute --closed--.

Signed and Sealed this
Twelfth Day of February, 2019

Andrei Iancu
*Director of the United States Patent and Trademark Office*